(12) United States Patent
Feng et al.

(10) Patent No.: US 9,995,979 B2
(45) Date of Patent: Jun. 12, 2018

(54) ARRAY SUBSTRATE, DISPLAY DEVICE, METHOD FOR MAINTAINING THE SAME AND METHOD FOR MANUFACTURING THE SAME

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Yaoyao Feng, Beijing (CN); Guoquan Liu, Beijing (CN); Chong Fang, Beijing (CN)

(73) Assignees: BOE TECHNOLOGY GROUP CO., LTD., Beijing (CN); HEFEI XINGSHENG OPTOELECTRONICS TECHNOLOGY CO.., Hefei, Anhui (CN)

( * ) Notice: Subject to any disclaimer, the term of this patent is extended or adjusted under 35 U.S.C. 154(b) by 0 days. days.

(21) Appl. No.: 15/108,832

(22) PCT Filed: Dec. 23, 2015

(86) PCT No.: PCT/CN2015/098370
§ 371 (c)(1),
(2) Date: Jun. 29, 2016

(87) PCT Pub. No.: WO2017/008446
PCT Pub. Date: Jan. 19, 2017

(65) Prior Publication Data
US 2017/0146874 A1    May 25, 2017

(30) Foreign Application Priority Data
Jul. 14, 2015    (CN) .......................... 2015 1 0418678

(51) Int. Cl.
G02F 1/1362  (2006.01)
G02F 1/1343  (2006.01)

(52) U.S. Cl.
CPC .... G02F 1/136259 (2013.01); G02F 1/13439 (2013.01); G02F 1/134309 (2013.01); (Continued)

(58) Field of Classification Search
None
See application file for complete search history.

(56) References Cited

U.S. PATENT DOCUMENTS

2003/0201438 A1    10/2003    Park
2003/0213966 A1*   11/2003    Yang ................. C23C 16/30
                                                       257/93
(Continued)

FOREIGN PATENT DOCUMENTS

CN    101211929 A    7/2008
CN    101216644 A    7/2008
(Continued)

OTHER PUBLICATIONS

First Office Action regarding Chinese Application No. 201510418678.6, dated May 15, 2017. Translation provided by Dragon Intellectual Property Law Firm.
(Continued)

Primary Examiner — Angel Roman
(74) Attorney, Agent, or Firm — Harness, Dickey & Pierce, P.L.C.

(57) ABSTRACT

The present disclosure provides an array substrate, a display device, a method for maintenance and a method for manufacturing the array substrate. The array substrate includes a base substrate and a plurality of signal lines arranged on the base substrate. The array substrate further includes: a plurality of common electrodes, wherein a hollow region is (Continued)

arranged between every two adjacent common electrodes, the signal lines are arranged to correspond to the hollow regions respectively, and an orthographic projection of each of the common electrodes on the base substrate is not overlapped with an orthographic projection of a corresponding signal line on the base substrate; and a plurality of maintenance lines that are arranged in the hollow regions respectively and arranged to be insulated from the signal lines, wherein at least a portion of an orthographic projection of each of the maintenance lines on the base substrate is overlapped with at least a portion of the orthographic projection of a corresponding signal line on the base substrate.

20 Claims, 4 Drawing Sheets

(52) U.S. Cl.
CPC .................. *G02F 1/136286* (2013.01); *G02F 2001/134318* (2013.01); *G02F 2001/136263* (2013.01); *G02F 2001/136272* (2013.01); *G02F 2001/136295* (2013.01); *G02F 2201/121* (2013.01)

(56) References Cited

U.S. PATENT DOCUMENTS

| | | |
|---|---|---|
| 2005/0094081 A1 | 5/2005 | Lee |
| 2017/0146874 A1 | 5/2017 | Feng et al. |

FOREIGN PATENT DOCUMENTS

| | | |
|---|---|---|
| CN | 101581838 A | 11/2009 |
| CN | 102023429 A | 4/2011 |
| CN | 201886251 U | 6/2011 |
| CN | 102213879 A | 10/2011 |
| CN | 104932128 A | 9/2015 |
| KR | 101309434 B1 | 9/2013 |

OTHER PUBLICATIONS

International Search Report and Written Opinion of the International Searching Authority for International Application No. PCT/CN2015/098370, dated Apr. 13, 2016. Translation provided by Dragon Intellectual Property Law Firm.

* cited by examiner

A-A

US 9,995,979 B2

ARRAY SUBSTRATE, DISPLAY DEVICE, METHOD FOR MAINTAINING THE SAME AND METHOD FOR MANUFACTURING THE SAME

CROSS REFERENCE OF RELATED APPLICATIONS

The present application is the U.S. national phase of PCT Application PCT/CN2015/098370 filed on Dec. 23, 2015, which claims the priority of Chinese patent application No. 201510418678.6 filed on Jul. 14, 2015, the disclosure of which is incorporated herein by reference in its entirety.

TECHNICAL FIELD

The present disclosure relates to the field of display technology, and in particular to an array substrate, a display device, a method for maintaining and a method for manufacturing the array substrate.

BACKGROUND

FIGS. 1 and 2 show a Liquid Crystal Display (LCD) device with a High Aperture advanced super Dimensional Switching (HADS) mode. The LCD device includes: an array substrate 100, a color filter substrate 200 and liquid crystals 300 arranged between the array substrate 100 and the color filter substrate 200. The array substrate 100 includes gate lines 101, data lines 102, pixel electrodes 103 and a whole common electrode layer 104 which is of a slot structure. The pixel electrodes 103 and the common electrode layer 104 are arranged to generate an electric field 400 for controlling deflections of liquid crystals.

Each of the data lines 102 is configured to be of a narrow line width, and thus a defect of data line open may occur during a process of manufacturing the array substrate 100. As shown in FIG. 1, it is necessary to decap a portion of the common electrode layer in a region 106 around a broken point 105 of a broken data line 102 (i.e. the region in the black block of FIG. 1) for maintaining a broken data line 102, so as to avoid a short circuiting between the broken data line 102 and the common electrode layer 104. After decapping the portion of the common electrode layer around the broken point 105, the broken data line may be repaired by processes such as drilling, depositing a maintenance material and forming a maintenance line 107.

In the above maintenance procedure, the common electrode layer 104 may be damaged, and thus an electric-field distribution may be adversely affected. As a result, the liquid crystals deflect abnormally (as shown in FIGS. 2 and 3), and a bright point producing visual effect similar to light leakage is formed below a black image frame, so that a display quality is deteriorated. Furthermore, the above maintenance procedure includes several processes such as decapping the portion of the common electrode layer, drilling, depositing the maintenance material and forming the maintenance line, and therefore is complex.

SUMMARY

In view of the above, a main object of the present disclosure is to provide an array substrate, a display device, a method for maintenance and a method for manufacturing the array substrate, so as to prevent from light leakage caused by the maintenance procedure in the related art and simplify the maintenance procedure in the related art.

The present disclosure provides in some embodiments an array substrate, including a base substrate and a plurality of signal lines arranged on the base substrate, wherein the array substrate further includes: a plurality of common electrodes, wherein a hollow region is arranged between every two adjacent common electrodes, the signal lines are arranged to correspond to the hollow regions respectively, and an orthographic projection of each of the common electrodes on the base substrate is not overlapped with an orthographic projection of a corresponding signal line on the base substrate; and a plurality of maintenance lines that are arranged in the hollow regions respectively and arranged to be insulated from the signal lines, wherein at least a portion of an orthographic projection of each of the maintenance lines on the base substrate is overlapped with at least a portion of the orthographic projection of a corresponding signal line on the base substrate.

Alternatively, the maintenance lines and the common electrodes are arranged in a same layer.

Alternatively, the maintenance lines and the common electrodes are made of a same material.

Alternatively, the array substrate further includes: connection lines, each of which connects corresponding two adjacent common electrodes.

Alternatively, the connection lines and the common electrodes are arranged in a same layer and made of a same material.

Alternatively, every two or more of the connection lines connect corresponding two adjacent common electrodes.

Alternatively, the signal lines are gate lines and/or data lines.

Alternatively, the array substrate further includes a plurality of common electrode lines, wherein each of the common electrodes corresponds to at least one of the common electrode lines, and an identical common electrode signal is applied to the common electrodes through the respective common electrode lines.

The present disclosure further provides in some embodiments a display device including the above array substrate.

The present disclosure further provides in some embodiments a method for maintaining an array substrate including a base substrate, a plurality of signal lines arranged, a plurality of common electrodes and a plurality of maintenance lines on the base substrate, wherein a hollow region is arranged between every two adjacent common electrodes, the signal lines are arranged to correspond to the hollow regions respectively, an orthographic projection of each of the common electrodes on the base substrate is not overlapped with an orthographic projection of a corresponding signal line on the base substrate, the maintenance lines are arranged in the hollow regions respectively and arranged to be insulated from the signal lines, and at least a portion of an orthographic projection of each of the maintenance lines on the base substrate is overlapped with at least a portion of the orthographic projection of a corresponding signal line on the base substrate; the method includes steps of: forming, in the case that one of the signal lines is broken, two via holes at two sides of a broken point of the broken signal line respectively; and connecting two broken portions of the broken signal line through the two via holes.

Alternatively, the maintenance lines and the common electrodes are arranged in a same layer, and the step of forming two via holes at two sides of a broken point of the broken signal line respectively includes a step of: forming two via holes penetrating through all layers between the broken signal line and a corresponding maintenance line at the two sides of the broken point of the broken signal line respectively.

Alternatively, the step of connecting two broken portions of the broken signal line through the two via holes includes steps of: depositing a conductive material in the two via holes, and connecting two broken portions of the broken signal line by a portion of a corresponding maintenance line between the two via holes.

Alternatively, the array substrate further includes: connection lines, wherein each of which connects corresponding two adjacent common electrodes, and the connection lines, the common electrodes and the maintenance lines are arranged in a same layer and made of a same material; wherein the step of connecting two broken portions of the broken signal line through the two via holes includes a step of: breaking the corresponding maintenance line at a side of each of the two via holes that is further from the broken point than the other side of the via hole before depositing the conductive material in the two via holes.

Alternatively, every two or more of the connection lines connect corresponding two adjacent common electrodes and a corresponding maintenance line, wherein the step of connecting two broken portions of the broken signal line through the two via holes includes steps of: breaking the corresponding maintenance line at a side of each of the two via holes away from the broken point before depositing the conductive material in the two via holes, in the case that the connection line is arranged between the two via holes.

The present disclosure further provides a method for manufacturing an array substrate, including steps of: providing a base substrate; and forming a plurality of signal lines, a plurality of common electrodes and a plurality of maintenance lines on the base substrate, wherein a hollow region is arranged between every two adjacent common electrodes, the signal lines are arranged to correspond to the hollow regions respectively, an orthographic projection of each of the common electrodes on the base substrate is not overlapped with an orthographic projection of a corresponding signal line on the base substrate, the maintenance lines are arranged in the hollow regions respectively and arranged to be insulated from the signal lines, and at least a portion of an orthographic projection of each of the maintenance lines on the base substrate is overlapped with at least a portion of the orthographic projection of a corresponding signal line on the base substrate.

Alternatively, the maintenance lines and the common electrodes are formed by one patterning process.

Alternatively, the manufacturing method further includes a step of forming connection lines on the base substrate, wherein each of the connection lines connects corresponding two adjacent common electrodes.

Alternatively, the connection lines and the common electrodes are formed by one patterning process.

Alternatively, the connection lines, the maintenance lines and the common electrodes are formed by one patterning process.

The technical effects of the above technical solutions may be as follows.

In the present disclosure, the signal line is arranged in the hollow region between the common electrodes. As a result, when the signal line is broken, it is not necessary to decap the common electrodes in the region around the broken point of the broken signal line to repair the broken data line, thereby simplifying the maintenance procedure, avoiding a damage to the common electrodes and reducing the maintenance risk. Furthermore, the maintenance lines are arranged in the hollow regions in advance, and thereby it is also not necessary to deposit a maintenance material and form the maintenance line. Instead, two via holes may be formed at two sides of a broken point of the broken signal line respectively, and then a conductive material is deposited in the via holes to connect the data line and the maintenance line, so as to connect the broken portions of the broken signal line, thereby improving maintenance efficiency.

DETAILED DESCRIPTION

Figure 1:
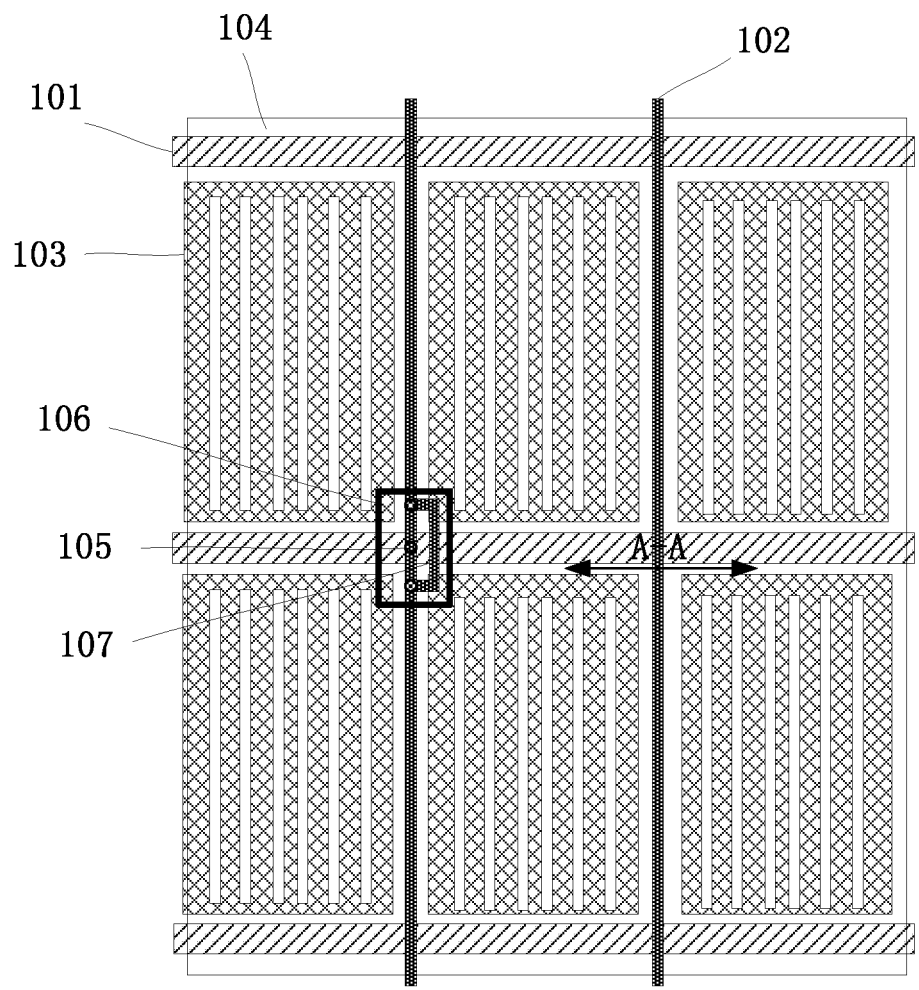
FIG. 1 is a top view of an array substrate of a LCD device with a HADS mode in the related art.
Figure 2:
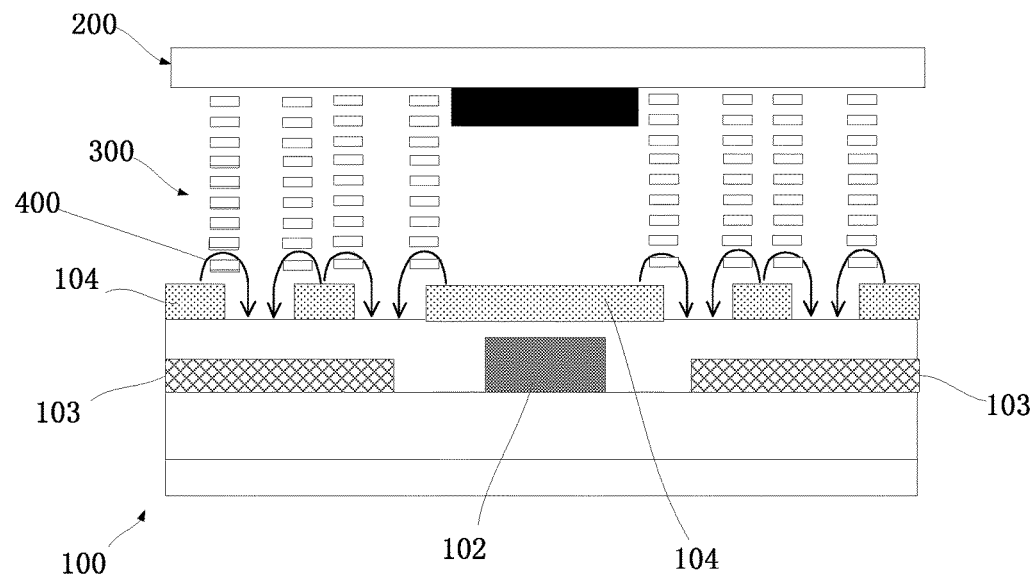
FIG. 2 is a schematic view showing an electric field distribution of the LCD device in the related art before a broken data line is repaired.
Figure 3:
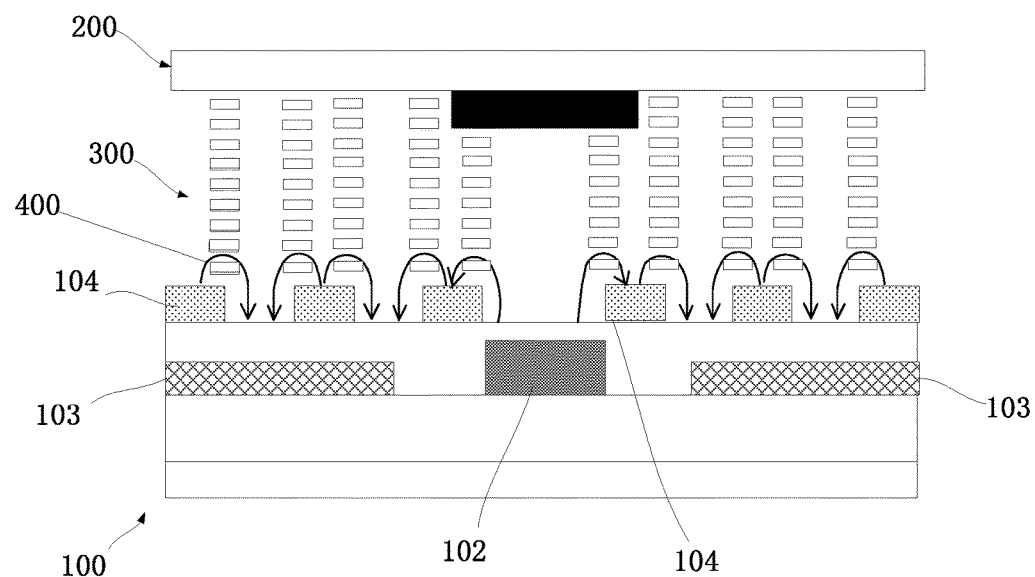
FIG. 3 is a schematic view showing the electric field distribution of the LCD device in the related art after the broken data line is repaired.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments an array substrate, so as to avoid a light leakage caused by the maintenance procedure in the related art and simplify the maintenance procedure in the related art. The array substrate includes:

a base substrate;

a plurality of signal lines that are arranged on the base substrate;

a plurality of common electrodes, wherein a hollow region is arranged between every two adjacent common electrodes, the signal lines are arranged to correspond to the hollow regions respectively, and an orthographic projection of each of the common electrodes on the base substrate is not overlapped with an orthographic projection of a corresponding signal line on the base substrate; and a plurality of maintenance lines that are arranged in the hollow regions respectively and arranged to be insulated from the signal lines, wherein at least a portion of an orthographic projection of each of the maintenance lines on the base substrate is overlapped with at least a portion of the orthographic projection of a corresponding signal line on the base substrate.

In the embodiments, the signal line is arranged in the hollow region between the common electrodes. As a result, when the signal line is broken, it is not necessary to decap the common electrodes in the region around the broken point of the broken signal line to repair the broken data line, thereby simplifying the maintenance procedure, avoiding a damage to the common electrodes and reducing the maintenance risk. Furthermore, the maintenance lines are arranged in the hollow regions in advance, and thereby it is also not necessary to deposit a maintenance material and form the maintenance line. Instead, two via holes may be formed at two sides of a broken point of the broken signal line respectively, and then a conductive material is deposited in the via holes to connect the data line and the maintenance line, so as to connect the broken portions of the broken signal line, thereby improving maintenance efficiency.

Alternatively, the maintenance lines and the common electrodes may be arranged in a same layer. In other words, the repair lines are not arranged on an independent layer, so as to reduce a thickness of the array substrate.

Furthermore, the maintenance lines and the common electrodes may be arranged in a same layer and made of a same material. In such case, the maintenance lines and the common electrodes may be formed by one patterning process, thereby simplifying the manufacturing process of the array substrate and reducing the manufacturing cost thereof. The common electrodes are typically made of a transparent and conductive material, such as Indium Tin Oxide (ITO).

Naturally, in some embodiments of the present disclosure, the maintenance lines and the common electrodes may be arranged on different layers. In some embodiments, the maintenance lines may be made of a conductive material such as metal, e.g. the maintenance lines and the signal lines may be made of same metal.

Alternatively, each of the maintenance lines may have a width that is substantially equal to a width of a corresponding signal line. Hence, an aperture ratio of a display region of the array substrate may not be affected adversely even if the maintenance lines are made of an opaque material such as metal.

Alternatively, the array substrate may further include: connection lines, each of which connects corresponding two adjacent common electrodes. Therefore, all of the common electrodes may be connected by the connection lines, so that voltages of the common electrodes may be substantially equal. In such case, an identical common electrode signal may be applied to each of the common electrodes merely by connecting a signal transmission line arranged on a periphery region of the array substrate to any one of the common electrodes.

Alternatively, in some embodiments of the present disclosure, the common electrodes are not connected to each other. Instead, common electrode lines are arranged, each of which corresponds to at least one of the common electrode lines, and then an identical common electrode signal is applied to the common electrodes through the respective common electrode lines.

Alternatively, the connection lines each connecting corresponding two adjacent common electrodes and the common electrodes may be arranged in a same layer, so that the adjacent common electrodes may be connected in a simplified manner without any via hole.

Furthermore, the connection lines and the common electrodes may be arranged in a same layer and made of a same material. In such case, the connection lines and the common electrodes may be formed by one patterning process, thereby simplifying the manufacturing process of the array substrate and reducing the manufacturing cost thereof.

Naturally, the connection lines and the common electrodes may be arranged on different layers and connected through the via holes.

Alternatively, the maintenance lines, the connection lines and the common electrodes are arranged in a same layer and made of a same material. As a result, the maintenance lines, the connection lines and the common electrodes may be formed by one patterning process, thereby simplifying the manufacturing process of the array substrate and reducing the manufacturing cost thereof. In the embodiments, the connection line for connecting the adjacent two common electrodes may be divided into two portions, where one portion connects one of the common electrodes and a corresponding maintenance line between the two adjacent common electrodes and the other portion connects the corresponding maintenance line and the other one of the common electrodes. Therefore, all of the common electrodes and all of the maintenance lines in the same layer may be connected in this manner.

In the embodiments, two adjacent common electrodes may be connected via at least one connection line.

In case that the maintenance lines, the connection lines and the common electrodes are arranged in the same layer and made of the same material, when the signal line is broken at a point near the corresponding connection line, it may be difficult to form a via hole between the broken point and the connection line. At this time, two via holes may be formed at two sides of the connection line respectively for maintaining the broken signal line, and then the connection line has to be cut off to prevent from a short circuiting between the signal line and the corresponding common electrodes. However, in case that the adjacent common electrodes are connected by only one connection line, an operation of the common electrodes may be adversely affected when the connection line is cut off. Hence, alternatively, the adjacent common electrodes may be connected by at least two connection lines, so that the connection of the adjacent common electrodes may not be adversely affected when one of the at least two connection lines has to be broken for maintaining the broken signal line.

When the broken signal line is repaired by one portion of the maintenance line and the maintenance line is connected to the common electrodes via the two portions of the connection line, one portion of the maintenance line is disconnected from the other portion thereof connecting to the common electrodes, so as to prevent from a short circuiting between the signal line and the corresponding common electrodes.

In some embodiments, the signal lines may be data lines or gate lines.

The present disclosure further provides in some embodiments a display device including the above-mentioned array substrate.

The present disclosure will be specifically described hereinafter in conjunction with the drawings and embodiments. The following embodiments are for illustrative purposes, but shall not be used to limit the scope of the present disclosure.

Figure 5:
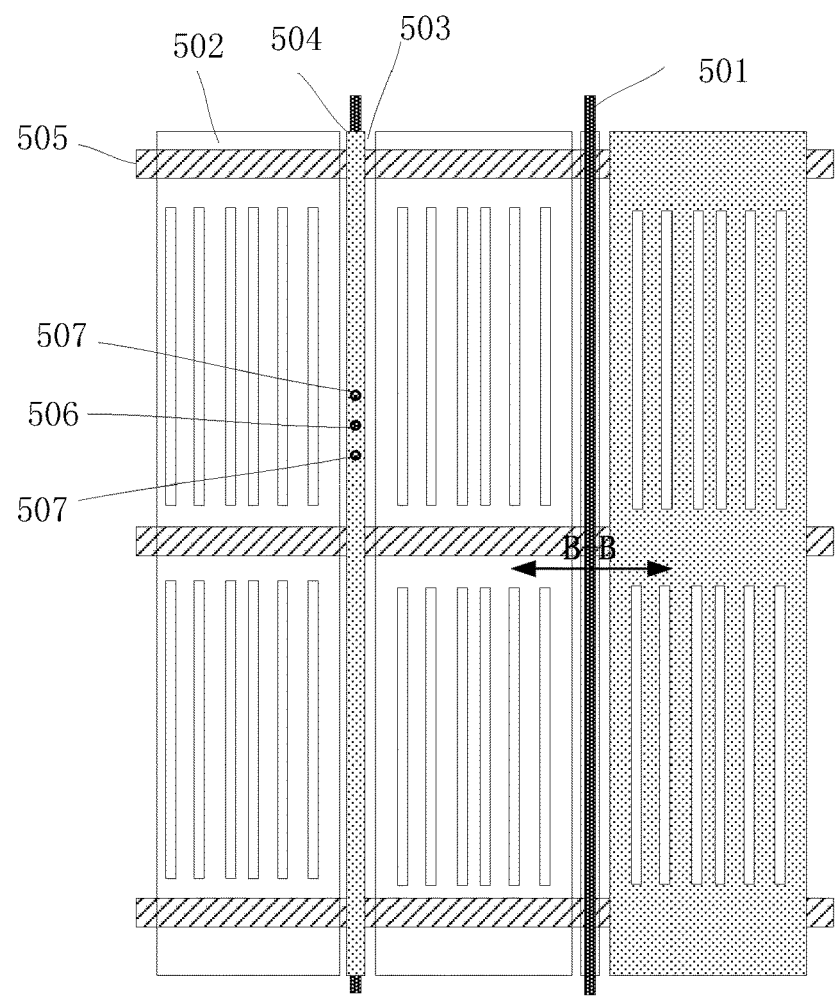
FIG. 5 is a schematic view of an array substrate according to some embodiments of the present disclosure.

FIG. 5 is the schematic view showing the array substrate according to the embodiments of the present disclosure. As shown in FIG. 5, the array substrate includes:

a base substrate (not shown);

a plurality of data lines 501 that are arranged on the base substrate;

a plurality of common electrodes 502, wherein a hollow region 503 is arranged between every two adjacent common electrodes 501, the data lines 501 are arranged to correspond to the hollow regions 503 respectively, and an orthographic projection of each of the common electrodes 502 on the base substrate is not overlapped with an orthographic projection of a corresponding data line 501 on the base substrate; and a plurality of maintenance lines 504 that are arranged in the hollow regions 503 respectively, wherein the maintenance lines 504 are insulated from the data lines 501, and at least a portion of an orthographic projection of each of the maintenance lines 504 on the base substrate is overlapped with at least a portion of the orthographic projection of a corresponding data line 501 on the base substrate.

Figure 4:
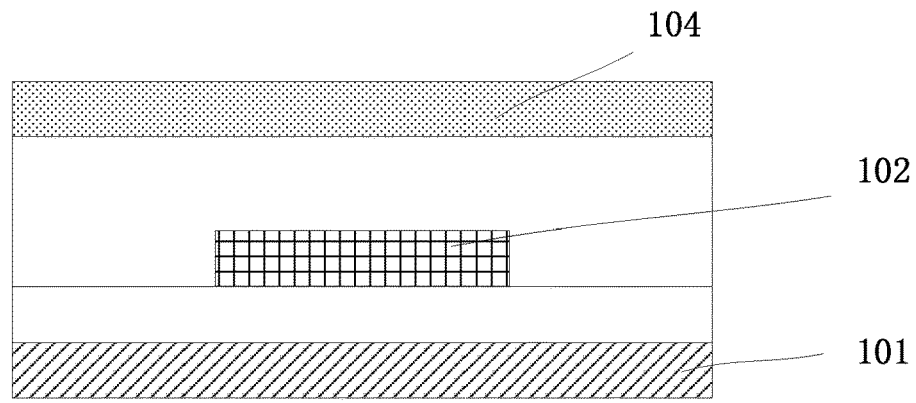
FIG. 4 is a sectional view of the array substrate along a line A-A shown in FIG. 1.
Figure 6:
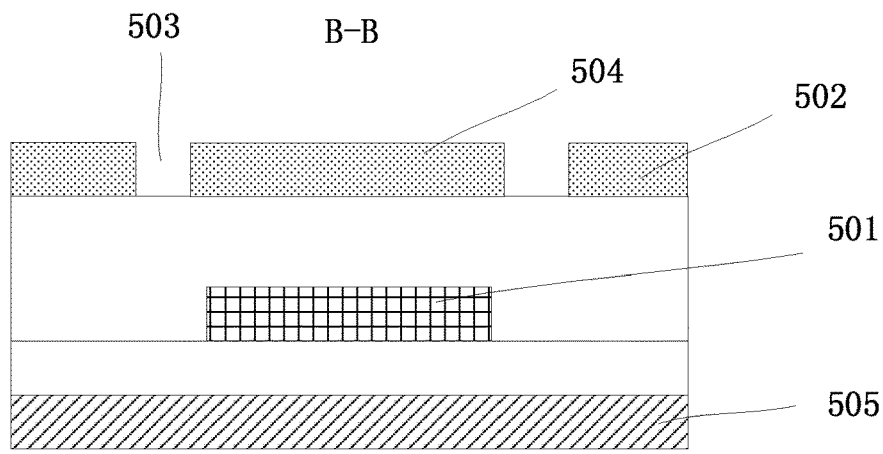
FIG. 6 is a sectional view of the array substrate along a line B-B shown in FIG. 5.

FIG. 4 is the sectional view of the conventional array substrate, and FIG. 6 is the sectional view of the array substrate according to the embodiments of the present disclosure. As shown in FIGS. 4 and 6, in the array substrate according to the embodiments of the present disclosure, in contrast to the array substrate in the related art, the common electrode 502 is separated at positions above the data lines 501, and the data lines 501 are arranged in the hollow regions 503 between every two adjacent separated parts of the common electrode 502.

Since the data line 501 is arranged in the hollow region 503 between the common electrodes 502, when the data line 501 is broken, it is not necessary to decap the common electrodes 502 in the region around the broken point 506 of the broken data line 501 to repair the broken data line 501, thereby simplifying the maintenance procedure and avoiding a damage to the common electrodes 502. Furthermore, the maintenance lines 504 are arranged in the hollow regions 503 in advance, and thereby it is also not necessary to deposit the maintenance material and form the maintenance line. Instead, two via holes may be formed at two sides of a broken point of the broken data line 501 respectively, and then a conductive material is deposited in the via holes to connect the data line 501 and the maintenance line 504, so as to connect the broken portions of the broken data line 501, thereby improving maintenance efficiency.

In the embodiments, the array substrate may further include a plurality of common electrode lines (not shown), wherein each of the common electrodes 502 corresponds to at least one of the common electrode lines, and a common electrode signal is applied to the common electrodes 502 through the respective common electrode lines. The common electrode lines and the gate lines 505 of the array substrate may be arranged in a same layer and made of a same material by one patterning process, thereby simplifying the manufacturing process of the array substrate and reducing the manufacturing cost thereof.

Figure 7:
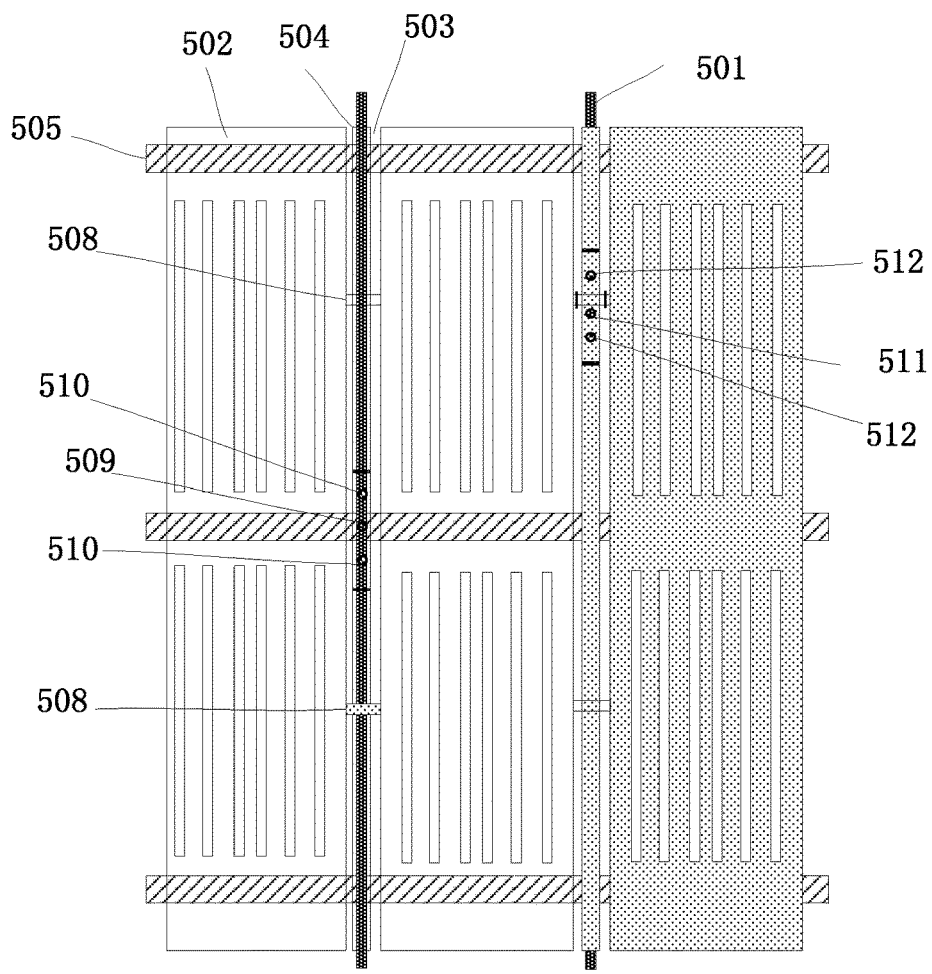
FIG. 7 is a schematic view showing an array substrate according to some embodiments of the present disclosure.

FIG. 7 is the schematic view showing the array substrate according to the embodiments of the present disclosure. As shown in FIG. 7, the array substrate includes:

a base substrate (not shown);

a plurality of data lines 501 and a plurality of gate lines 505 arranged on the base substrate;

a plurality of common electrodes 502, wherein a hollow region 503 is arranged between every two adjacent common electrodes 501, the data lines 501 are arranged to correspond to the hollow regions 503 respectively, and an orthographic projection of each of the common electrodes 502 on the base substrate is not overlapped with an orthographic projection of a corresponding data line 501 on the base substrate;

a plurality of maintenance lines 504 that are arranged in the hollow regions 503 respectively, wherein the maintenance lines 504 and the common electrodes 502 are arranged in a same layer and made of a same material, at least a portion of an orthographic projection of each of the maintenance lines 504 on the base substrate is overlapped with at least a portion of the orthographic projection of a corresponding data line 501 on the base substrate; and a plurality of connection lines 508, wherein each one or more of the connection lines 508 each connects corresponding two adjacent common electrodes 502, and the connection lines 508 and the common electrodes 502 are arranged in a same layer and made of a same material, wherein the connection line 508 for connecting the adjacent two common electrodes may be divided into two portions, one portion connects one of the common electrodes 502 and the maintenance line 504 between the two adjacent common electrodes 502, and the other portion connects the maintenance line 504 and the other one of the common electrodes 502. Therefore, all of the common electrodes 502 and all of the maintenance lines 504 in the same layer may be connected in this manner.

In the embodiments of the present disclosure, since the data line 501 is arranged in the hollow region 503 between the common electrodes 502, when the data line 501 is broken, it is not necessary to decap the common electrodes 502 in the region around the broken point 506 of the broken data line 501 to repair the broken data line 501, thereby simplifying the maintenance procedure and avoiding a damage to the common electrodes 502. Furthermore, the maintenance lines 504 are arranged in the hollow regions 503 in advance, and thereby it is also not necessary to deposit the maintenance material and form the maintenance line. Instead, two via holes may be formed at two sides of a broken point of the broken data line 501 respectively, and then a conductive material is deposited in the via holes to connect the data line 501 and the maintenance line 504, so as to connect the broken portions of the broken data line 501, thereby improving maintenance efficiency.

Furthermore, the maintenance lines 504, the connection lines 508 and the common electrodes 502 may be arranged in a same layer and made of a same material by one patterning process, thereby simplifying the manufacturing process of the array substrate and reducing the manufacturing cost thereof. In addition, all of the common electrodes 502 and all of the maintenance lines 504 in the same layer may be connected by the connection lines 508, so that voltages of the common electrodes may be substantially equal.

In the above embodiments, the array substrate is an array substrate with a HADS mode, and each of the common electrodes 502 is of a slot structure. However, in some other embodiments of the present disclosure, the array substrate may be an array substrate with other modes, and each of the common electrodes 502 is not limited to be of a slot structure.

The present disclosure further provides in some embodiments a method for maintaining the above-mentioned array substrate, wherein the method includes steps of:

step S11: forming, in case that one of the signal lines is broken, two via holes at two sides of a broken point of the broken signal line respectively; and step S12: connecting two broken portions of the broken signal line through the two via holes.

In the embodiments, the signal line is arranged in the hollow region between the common electrodes. As a result, when the signal line is broken, it is not necessary to decap the common electrodes in the region around the broken point of the broken signal line to repair the broken data line, thereby simplifying the maintenance procedure, avoiding a damage to the common electrodes and reducing the maintenance risk. Furthermore, the maintenance lines are arranged in the hollow regions in advance, and thereby it is also not necessary to deposit a maintenance material and form the maintenance line. Instead, two via holes may be formed at two sides of a broken point of the broken signal line respectively, and then a conductive material is deposited in the via holes to connect the data line and the maintenance line, so as to connect the broken portions of the broken signal line, thereby improving maintenance efficiency.

Alternatively, the maintenance lines and the common electrodes are arranged in a same layer, and the step of forming two via holes at two sides of a broken point of the broken signal line respectively includes a step of:

forming two via holes penetrating through all layers between the broken signal line and a corresponding maintenance line at the two sides of the broken point of the broken signal line respectively;

the step of connecting two broken portions of the broken signal line through the two via holes includes steps of:

depositing a conductive material in the two via holes, and connecting two broken portions of the broken signal line by a portion of a corresponding maintenance line between the two via holes.

Alternatively, the array substrate further includes: connection lines, wherein each of which connects corresponding two adjacent common electrodes, and the connection lines, the common electrodes and the maintenance lines are arranged in a same layer and made of a same material;

the maintaining method further includes a step of:

breaking the corresponding maintenance line at a side of each of the two via holes away from the broken point.

Alternatively, every two or more of the connection lines connect corresponding two adjacent common electrodes and a corresponding maintenance line, the maintaining method further includes steps of:

breaking the corresponding maintenance line at a side of each of the two via holes away from the broken point and breaking a connection line, in case that the connection line is arranged between the two via holes.

In the embodiments as shown in FIG. 5, when the data line 501 is broken, two via holes 507 are formed at two sides of the broken point 506 respectively, and the conductive material is deposited in the via holes 507, so as to connect the data line 501 and the maintenance line 504.

In the embodiments as shown in FIG. 7, when the data line 501 is broken at a broken point 509, two via holes 507 are formed at two sides of the broken point 509 respectively, the maintenance line 504 is broken at a side of each of the two via holes 510 away from the broken point 509, and the conductive material is deposited in the via holes 510, so as to prevent from a short circuiting between the signal line 501 and the common electrodes 502.

When the data line 501 is broken at a broken point 511 near the connection line 508, two via holes 512 are formed at two sides of the broken point 511 respectively, the maintenance line 504 is broken at a side of each of the two via holes 512 away from the broken point 509, the connection line 508 near the broken point 511 is broken, and then the conductive material is deposited in the via holes 512, so as to prevent from a short circuiting between the signal line 501 and the common electrodes 502.

In the above embodiments, the via holes may be formed by laser drilling for maintaining the broken signal line. In addition, the conductive material to be deposited in the via holes may be metal, e.g. tungsten.

The present disclosure further provides in some embodiments a method for manufacturing an array substrate, including steps of:

providing a base substrate;

forming a plurality of signal lines, a plurality of common electrodes and a plurality of maintenance lines on the base substrate, wherein a hollow region is arranged between every two adjacent common electrodes, the signal lines are arranged to correspond to the hollow regions respectively, an orthographic projection of each of the common electrodes on the base substrate is not overlapped with an orthographic projection of a corresponding signal line on the base substrate, the maintenance lines are arranged in the hollow regions respectively and arranged to be insulated from the signal lines, and at least a portion of an orthographic projection of each of the maintenance lines on the base substrate is overlapped with at least a portion of the orthographic projection of a corresponding signal line on the base substrate.

Alternatively, the maintenance lines and the common electrodes are formed by one patterning process.

Alternatively, the manufacturing method further includes steps of:

forming connection lines on the base substrate, wherein each one or more of the connection lines each connects corresponding two adjacent common electrodes.

Alternatively, the connection lines and the common electrodes are formed by one patterning process.

Alternatively, the connection lines, the maintenance lines and the common electrodes are formed by one patterning process.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An array substrate, comprising a base substrate and a plurality of gate lines and data lines arranged on the base substrate, wherein the array substrate further comprises:
    a plurality of common electrodes, wherein a hollow region is arranged between every two adjacent common electrodes, the data lines are arranged to correspond to the hollow regions respectively, and an orthographic projection of each of the common electrodes on the base substrate is not overlapped with orthographic projections of the data lines on the base substrate; and
    a plurality of maintenance lines that are arranged in the hollow regions respectively and arranged to be insulated from the gate lines and the data lines, wherein at least a portion of an orthographic projection of each of the maintenance lines on the base substrate is overlapped with at least a portion of the orthographic projection of a corresponding data line on the base substrate, and at least a portion of the orthographic projection of each of the maintenance lines on the base substrate is overlapped with at least a portion of the orthographic projection of a corresponding gate line on the base substrate.

2. The array substrate according to claim 1, wherein the maintenance lines and the common electrodes are arranged in a same layer.

3. The array substrate according to claim 2, wherein the maintenance lines and the common electrodes are made of a same material.

4. The array substrate according to claim 1, further comprising:
connection lines, each of which connects corresponding two adjacent common electrodes.

5. The array substrate according to claim 4, wherein the connection lines and the common electrodes are arranged in a same layer and made of a same material.

6. The array substrate according to claim 4, wherein every two or more of the connection lines connect corresponding two adjacent common electrodes.

7. The array substrate according to claim 1, further comprising a plurality of common electrode lines, wherein each of the common electrodes corresponds to at least one of the common electrode lines, and an identical common electrode signal is applied to the common electrodes through the respective common electrode lines.

8. A display device comprising the array substrate according to claim 1.

9. A method for maintaining an array substrate comprising a base substrate, a plurality of gate lines and data lines, a plurality of common electrodes and a plurality of maintenance lines arranged on the base substrate, wherein a hollow region is arranged between every two adjacent common electrodes, the data lines are arranged to correspond to the hollow regions respectively, an orthographic projection of each of the common electrodes on the base substrate is not overlapped with orthographic projections of the data lines on the base substrate, the maintenance lines are arranged in the hollow regions respectively and arranged to be insulated from the gate lines and the data lines, and at least a portion of an orthographic projection of each of the maintenance lines on the base substrate is overlapped with at least a portion of the orthographic projection of a corresponding data line on the base substrate, and at least a portion of the orthographic projection of each of the maintenance lines on the base substrate is overlapped with at least a portion of the orthographic projection of a corresponding gate line on the base substrate, wherein the method comprises steps of:
forming, in a case that one of the data lines is broken, two via holes at two sides of a broken point of the broken data line respectively; and
connecting two broken portions of the broken data line through the two via holes.

10. The method according to claim 9, wherein the maintenance lines and the common electrodes are arranged in a same layer, and
the step of forming two via holes at two sides of the broken point of the broken data line respectively comprises a step of:
forming two via holes penetrating through all layers between the broken data line and a corresponding maintenance line at the two sides of the broken point of the broken data line respectively.

11. The method according to claim 9, wherein the step of connecting two broken portions of the broken data line through the two via holes comprises steps of:
depositing a conductive material in the two via holes, and connecting two broken portions of the broken data line by a portion of a corresponding maintenance line between the two via holes.

12. The method according to claim 11, wherein the array substrate further comprises connection lines, each of which connects corresponding two adjacent common electrodes, and the connection lines, the common electrodes and the maintenance lines are arranged in a same layer and made of a same material,
wherein the step of connecting two broken portions of the broken data line through the two via holes comprises a step of:
breaking the corresponding maintenance line at a side of each of the two via holes away from the broken point before depositing the conductive material in the two via holes.

13. The method according to claim 12, wherein every two or more of the connection lines connect corresponding two adjacent common electrodes and a corresponding maintenance line,
wherein the step of connecting two broken portions of the broken data line through the two via holes comprises steps of:
breaking the corresponding maintenance line at a side of each of the two via holes away from the broken point and breaking a connection line before depositing the conductive material in the two via holes, in a case that the connection line is arranged between the two via holes.

14. A method for manufacturing an array substrate, comprising steps of:
providing a base substrate; and
forming a plurality of gate lines and data lines, a plurality of common electrodes and a plurality of maintenance lines on the base substrate, wherein a hollow region is arranged between every two adjacent common electrodes, the data lines are arranged to correspond to the hollow regions respectively, an orthographic projection of each of the common electrodes on the base substrate is not overlapped with orthographic projections of the data lines on the base substrate, the maintenance lines are arranged in the hollow regions respectively and arranged to be insulated from the gate lines and the data lines, and at least a portion of an orthographic projection of each of the maintenance lines on the base substrate is overlapped with at least a portion of the orthographic projection of a corresponding data line on the base substrate, and at least a portion of the orthographic projection of each of the maintenance lines on the base substrate is overlapped with at least a portion of the orthographic projection of a corresponding gate line on the base substrate.

15. The method according to claim 14, wherein the maintenance lines and the common electrodes are formed by one patterning process.

16. The method according to claim 14, further comprising a step of:
forming connection lines on the base substrate, wherein each of the connection lines connects corresponding two adjacent common electrodes.

17. The method according to claim 16, wherein the connection lines and the common electrodes are formed by one patterning process.

18. The method according to claim 16, wherein the connection lines, the maintenance lines and the common electrodes are formed by one patterning process.

19. The display device according to claim 8, wherein the maintenance lines and the common electrodes are arranged in a same layer.

20. The array substrate according to claim 1, wherein the maintenance lines are arranged at a plane different from the gate lines.

* * * * *

UNITED STATES PATENT AND TRADEMARK OFFICE
CERTIFICATE OF CORRECTION

| | |
|---|---|
| PATENT NO. | : 9,995,979 B2 |
| APPLICATION NO. | : 15/108832 |
| DATED | : June 12, 2018 |
| INVENTOR(S) | : Yaoyao Feng et al. |

It is certified that error appears in the above-identified patent and that said Letters Patent is hereby corrected as shown below:

On the Title Page

Item [73], delete "HEFEI XINSHENG OPTOELECTRONICS TECHNOLOGY CO..," insert
-- HEFEI XINSHENG OPTOELECTRONICS TECHNOLOGY CO., LTD. --

Signed and Sealed this
Twenty-eighth Day of May, 2019

Andrei Iancu
*Director of the United States Patent and Trademark Office*